Jan. 16, 1951 — H. W. KLEIST — 2,538,015
LIQUID COOLER
Filed Jan. 17, 1948 — 2 Sheets-Sheet 1

Inventor
Herman W. Kleist
by Parker & Carter
Attorneys

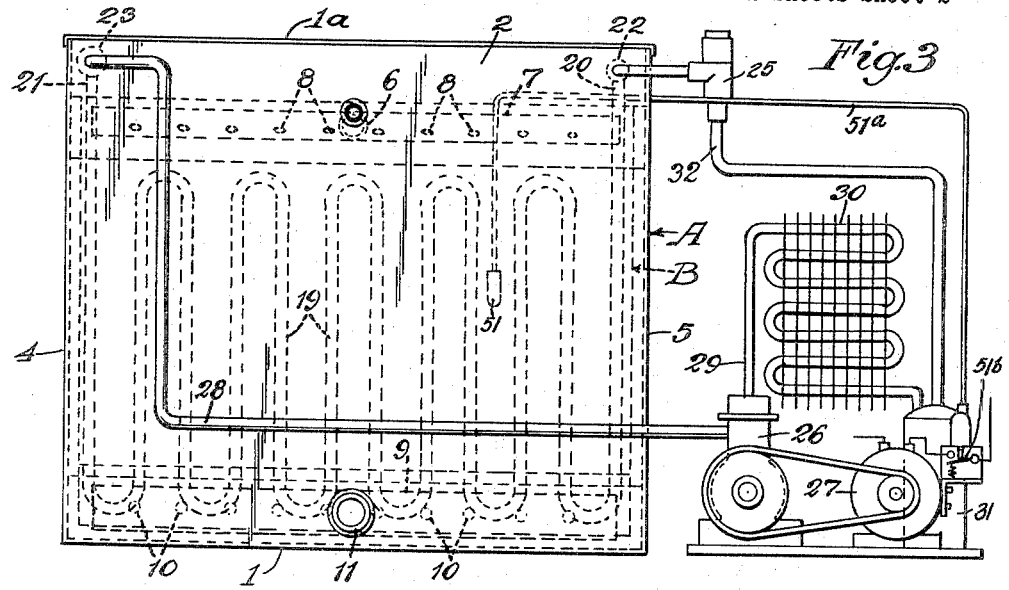
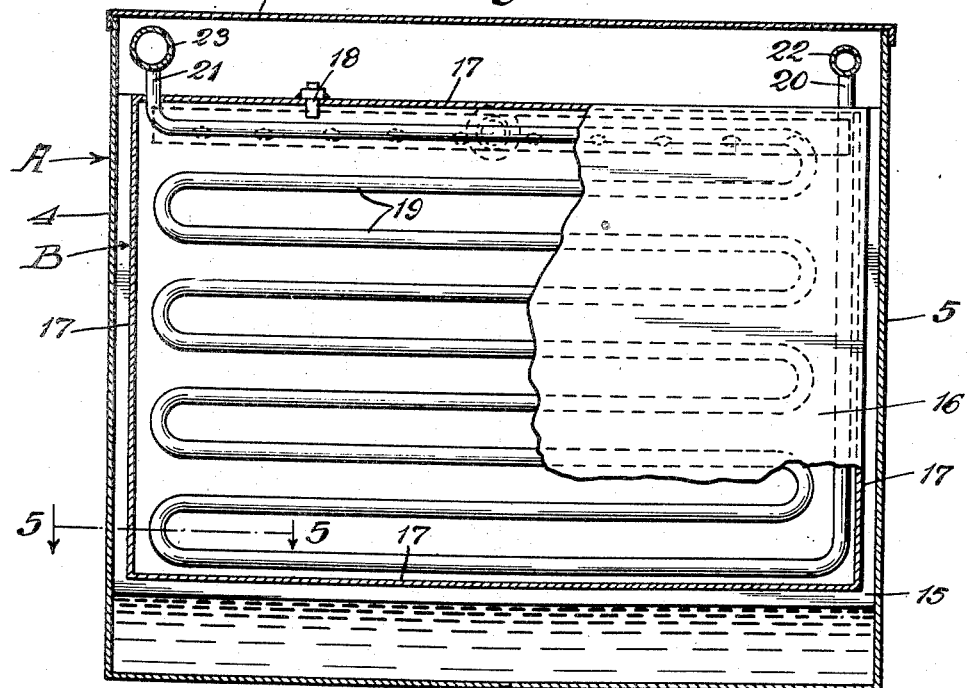
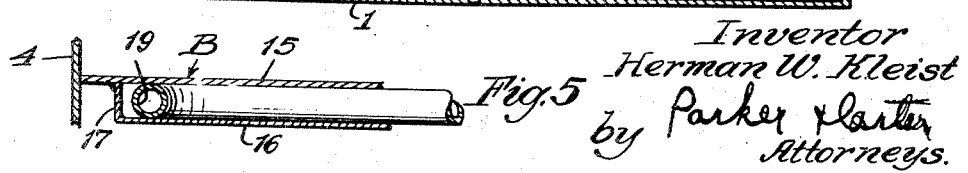

Patented Jan. 16, 1951

2,538,015

UNITED STATES PATENT OFFICE 2,538,015

LIQUID COOLER

Herman W. Kleist, Chicago, Ill., assignor to Dole Refrigerating Company, Chicago, Ill., a corporation of Illinois Application January 17, 1948, Serial No. 2,860

2 Claims. (Cl. 62—141)

My invention relates to an improvement in liquid coolers, and applies, for example, to water coolers.

One purpose is to provide an improved mechanism for cooling water.

Another purpose is to provide a water cooling system or mechanism for cooling water or other liquids in more or less continuous flow.

Another purpose is to provide an improved liquid or water cooling structure in which one effect is to build up a layer of ice along the path of circulating water.

Another purpose is to provide a water cooler of the ice forming type in which the water is constrained to flow along a predetermined tortuous path, regardless of whether or not ice is present, or has been formed along the path of flow of the water.

Other purposes will appear from time to time in the course of the specification and claims.

Whereas I illustrate my invention in connection with a water cooler, it will be understood that it may be employed to cool other liquids or mixtures of liquids.

I illustrate my invention more or less diagrammatically in the accompanying drawings wherein:

Figure 3 is a side elevation with parts dotted in;

Figure 4 is a section on an enlarged scale, on the line 4—4 of Figure 2, with parts broken away, showing a variant coil;

Figure 5 is a section on an enlarged scale, on the line 5—5 of Figure 4.

Like parts are indicated by like symbols throughout the specification and drawings.

Figure 1:
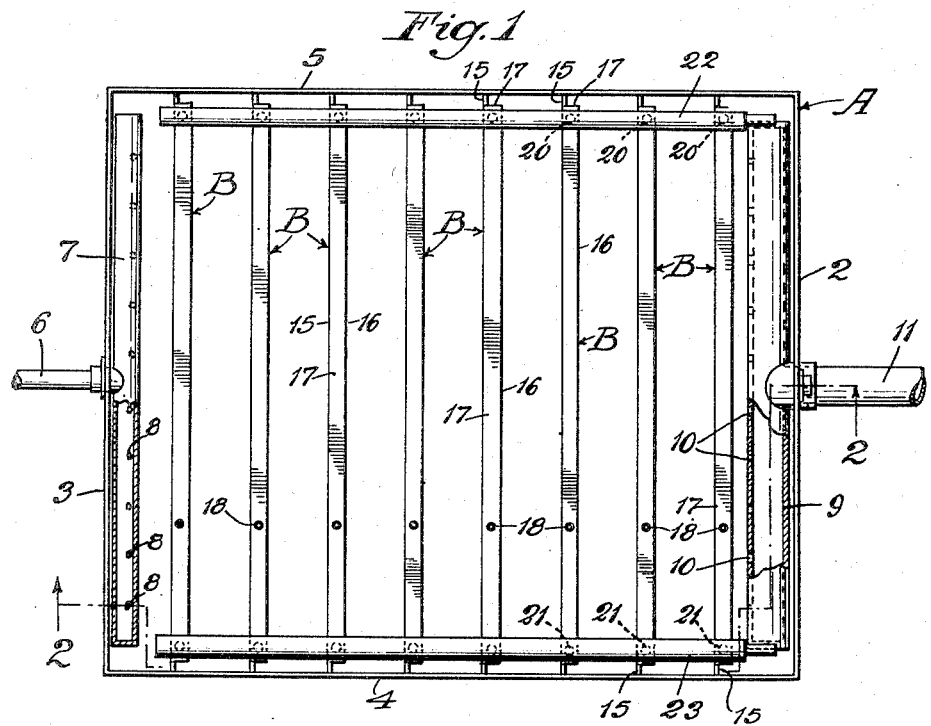
Figure 1 is a plan view with parts broken away and parts in horizontal section.

Referring to the drawings, A generally indicates a liquid receiving housing through which a liquid, such as water, may be circulated. It includes a bottom wall 1, end walls 2, 3, and side walls 4, 5. Any suitable cover, not herein shown, may be employed. Water or any other liquid to be cooled may be admitted along a pipe or duct 6, which communicates with a header or distributor 7, having any suitable outlet apertures 8, spaced therealong. Thus the liquid to be cooled will be delivered simultaneously along substantially the entire width of the cooling chamber, and at or near the top of the cooling chamber.

Adjacent the bottom of the opposite end of the cooling chamber I provide an outlet manifold 9 with apertures 10, and an outlet duct 11. It will be understood that the liquid may be supplied intermittently, or may be circulated constantly through the cooling chamber, any suitable admission or circulating or pumping means, not herein shown, being employed. It will be understood that the specific means for supplying or circulating the liquid may be widely varied, my invention being primarily directed to the means for cooling the liquid which are adaptable for use with liquid, either in generally static storage or in circulation.

As a cooling mechanism I employ a plurality of evaporator plates, generally indicated as B. Each such plate is shown as including a pair of generally parallel walls 15 and 16, which may be connected by circumferential edge or side walls 17, which may, for example, be integral with or struck up from the wall 16. The walls are preferably closed, by welding or otherwise, to enclose a sealed interior space entirely closed to the atmosphere, and, of course, to the surrounding liquid. I find it important to employ plane surfaced plates. It may be advantageous, but is not strictly necessary, to employ plates of the vacuum type, in which part of the air is exhausted from the interior of the plate through any suitable fitting 18, which may thereafter be sealed. The result is to cause the exterior atmospheric pressure to urge the walls 15 and 16 toward each other and against an interior evaporating coil or duct 19, which I position within each plate. If desired, I may add an eutectic solution to the space around the coil 19 and within the walls 15 and 16, to provide a so-called "hold-over" effect. This feature, however, may, under many circumstances, be omitted.

Each evaporator coil 19 has an inlet duct 20 and an outlet duct 21, which may communicate with any suitable supply manifold 22 and discharge manifold 23. Whereas I illustrate the plates as arranged in parallel, it will be understood that any other suitable arrangement may be employed. However, in the form of the device herein shown, I arrange them in parallel and employ a single pressure-reducing element 25 to which liquid refrigerant is admitted under pressure.

In order to cycle the volatile refrigerant, I employ any suitable compressor 26, which may be driven by any suitable motor 27, the details of which do not form part of the present invention. 28 indicates a low pressure or suction or return duct, along which the evaporated refrigerant returns to the compressor. 29 is a high pressure duct along which the compressed refrigerant is delivered to any suitable condenser 30, whence the liquid refrigerant, still under pressure, flows to any suitable receiver 31 and thence, along the high pressure supply duct 32, to the pressure reducing element 25.

Whereas I have shown a practical and satisfactory cycling means, it will be understood that any other suitable means for causing the evaporation of a volatile refrigerant within the plates B may be employed.

It will be realized that, whereas, I have described and illustrated a practical and operative device, nevertheless many changes may be made in the size, shape, number and disposition of parts without departing from the spirit of my invention. I therefore wish my description and drawings to be taken as in a broad sense illustrative or diagrammatic, rather than as limiting me to my precise showing.

For example, whereas I illustrate a unit in which the plates B are vertically arranged, I do not wish to be limited to any specific angle or location of plates or to any specific relation between the plates and the inlet and outlet means. What is essential is that I maintain a storage body of liquid in a space in which a plurality of refrigerating plates, in association with a surrounding housing, define a tortuous path for the liquid, between the liquid inlet area and the liquid outlet area.

Figure 2:
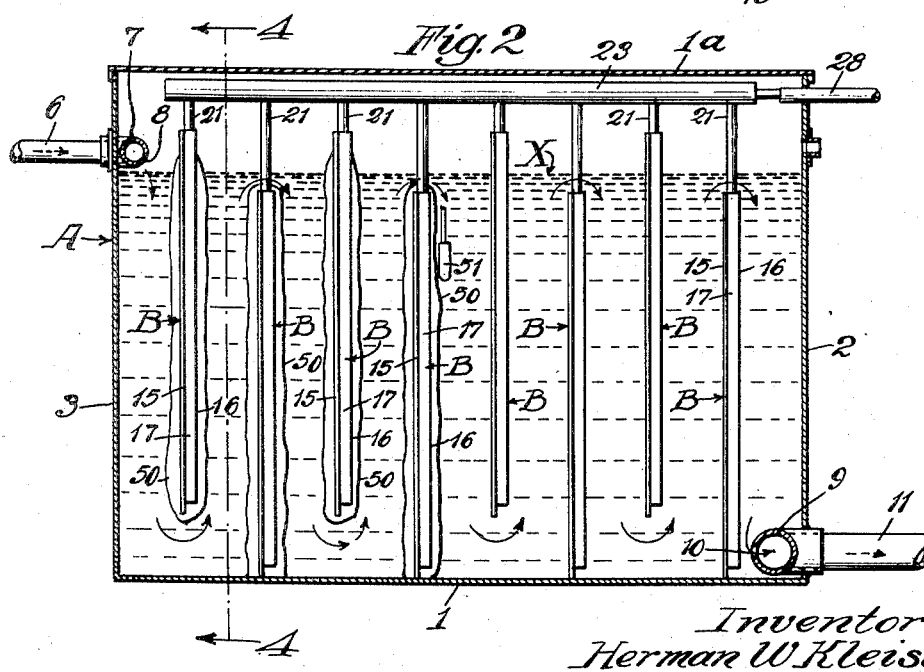
Figure 2 is a section on the line 2—2 of Figure 1.

The use and operation of the invention are as follows:

I maintain, in the tank or chamber A, a supply of a liquid to be cooled. This liquid may, for example, be water. My invention may be used in connection with the more or less static bodies of liquid to which additional liquid is intermittently supplied. It is also advantageously useable in situations where a liquid is more or less continuously circulated through a tank or cooling zone. In the use of the invention as herein shown, I illustrate what may be used as a circulating chamber, through which water may be circulated by being admitted along the pipe 6 and withdrawn along the pipe 11. The individual plates B may be pressure fitted, or otherwise secured within the tank A, between the walls 4 and 5. They are, however, arranged in staggered relation, as shown in Figure 2, four of the plates having their edges abutting against the bottom wall 1, the other four having their lower edges spaced substantially above the bottom wall 1, and also substantially above the maintained liquid level illustrated at X.

In the use of the device, as the refrigerant is cycled and evaporated, a coating of ice 50 forms on the surfaces of the plates. In order to prevent the ice from reaching a thickness sufficient to impede the flow of water, I provide any suitable heat sensitive member 51, shown, for example, in Figure 2, which may be employed suitably to control any suitable actuating electric circuit for the motor 27. For example, I illustrate in Figure 3 a duct 51a extending to any suitable motor control switch 51b. It will thus be understood that when the bulb 51 is subjected to a predetermined low temperature it actuates the switch 51b to stop further operation of the motor 27, thus preventing further cycling until after a temperature rise, caused by the melting of the coating of ice. Thus when the ice builds up to a predetermined distance, or the member 51 is subjected to a predetermined low temperature, the cycling process is interrupted until refrigeration is again needed. The water flows below the lower edges of some of the plates and over the upper edges of the others, and flows across the surface of the formed ice.

The use of a body of ice provides, in effect, a storage medium, reducing the time during which cycling need continue. This storage effect may be supplemented or increased, if desired, by the use of an eutectic solution within the plates, but this is not generally necessary.

As will be clear from the drawings, it is advantageous, and, under most circumstances, necessary, to enclose the manifolds 22 and 23. I thus carry the walls 2, 3, 4 and 5 to a level above the level of the manifold and provide a cover plate or closure 1a. This is important in order to prevent wastage of the additional refrigeration of the manifolds. It will be understood, of course, that the manifolds may be positioned at a somewhat lower level than they are shown in the drawings, if desired. However, for example, with reference to Figure 2, the manifold 23 would have to be at a higher level than the water inlet 6.

Whereas, in Figure 3, I have illustrated the coils as having vertical lengths connected by bends, it may be more advantageous to have them horizontally arranged, as shown in dotted line in Figure 4.

In practice I find it highly important to employ some form of laterally extended inlet distributor, such as the member 7, preferably in connection with an outlet manifold, such as the member 9. I thus prevent any localization of flow and provide a substantially uniform rate of intake and outgo across the entire width of the tank. In use, this is highly advantageous, and insures a full use of the entire width or surface of each plate, and thus results in a substantial increase in the efficiency and capacity of the unit as compared, for example, to a localized inlet and outlet flow.

I claim:

1. In means for cooling liquids, including water, a tank adapted to receive the liquid to be cooled, said tank having side walls, end walls and a bottom wall, said tank having an inlet and an outlet, a plurality of refrigerating plates in said tank extending between the side walls, said plates being staggered to define, with the tank walls, a tortuous path from the liquid inlet to the liquid outlet, some of the plates being in substantially liquid-tight relation with the bottom wall and side walls, while adjacent plates have lower edge portions defining liquid passages above the bottom wall, said first mentioned plates having upper edge portions at a level, in relation to the normal level of liquid in the tank, to permit the liquid to flow thereover, said plates having plane surfaced, generally parallel, outside walls, and a refrigerant receiving coil within and between said walls, means for cycling a volatile refrigerant through said coils and for thereby reducing the temperature of said plates to below the freezing temperature of the liquid, whereby a layer of ice forms on said plates, and means for terminating the cycling of said volatile refrigerant upon the formation of a predetermined layer of ice coating upon the exterior of said plates, whereby said ice coating is adapted to constitute a cold storage means for maintaining the liquid cool intermediate the cycling periods of the volatile refrigerant.

2. In means for cooling liquids, including water, a tank adapted to receive the liquid to be cooled, said tank having side walls, end walls and a bottom wall, said tank having an inlet and an outlet, a plurality of refrigerating plates in said tank, said plates having plane surfaced, generally parallel, outside walls, and a refrigerant receiving coil within and between said walls, means for cycling a volatile refrigerant through said coils and for thereby reducing the temperature of said plates to below the freezing temperature of the liquid, whereby a layer of ice forms on said plates, and means for terminating the cycling of said volatile refrigerant upon the formation of a predetermined layer of ice coating upon the exterior of said plates, whereby said ice coating is adapted to constitute a cold storage means for maintaining the liquid cool intermediate the cycling periods of the volatile refrigerant.

HERMAN W. KLEIST.

REFERENCES CITED

The following references are of record in the file of this patent:

UNITED STATES PATENTS

| Number | Name | Date |
| --- | --- | --- |
| 1,856,467 | Copp | May 3, 1932 |
| 2,221,423 | Reinhardt | Nov. 12, 1940 |
| 2,261,418 | Schwerz | Nov. 4, 1941 |
| 2,271,648 | Kleist | Feb. 2, 1942 |
| 2,405,432 | Kleist | Aug. 6, 1946 |
| 2,448,453 | Morrison | Aug. 31, 1948 |